Jan. 19, 1932.  L. R. SMITH  1,842,298

UNDERGROUND PIPE LINE

Filed Feb. 11, 1929

INVENTOR.

LLOYD R. SMITH

BY

ATTORNEY.

Patented Jan. 19, 1932

1,842,298

UNITED STATES PATENT OFFICE

LLOYD RAYMOND SMITH, OF MILWAUKEE, WISCONSIN, ASSIGNOR TO A. O. SMITH CORPORATION, OF MILWAUKEE, WISCONSIN, A CORPORATION OF NEW YORK

UNDERGROUND PIPE LINE

Application filed February 11, 1929. Serial No. 339,149.

This invention relates to underground and surface pipe lines such as those employed for transmitting oil and gas from the fields to the refineries or distribution system.

Where the pipe is laid underground and through many different types of soils, the life thereof is limited by the resistance of the pipe to the corrosiveness of the soil.

There are several ways in which the life of the pipe may be lengthened. Perhaps the most effective method heretofore lies in coating the pipe with a corrosion-proof material to postpone starting of the corrosion of the metal. Many different types of coatings have been employed, including the asphalt or tar coating, the advantage of which lies in its plasticity and ability to conform to the expansion, contraction, and bending of the pipe without cracking. However, the various stones and particles of soil impress themselves into the outer surface of the soft plastic coating and tend to abrade the same as the pipe expands and contracts from varying temperatures, and other causes. The result is that the coating is torn from the pipe and this allows the corrosion of the metal to start immediately.

The present invention overcomes the above difficulties by providing a protective coating which is not subject to the abrasion of the soil and which is integral with the pipe.

The invention resides in providing a pipe line coated with a vitreous enamel.

The baking of the enamel makes it adhere to and from an integral union with the pipe, and provides a smooth surface of sufficient hardness to prevent penetration of stones and particles of soil.

The enamel will expand and contract with the pipe and, due to the lack of abrasion thereof, will protect the pipe from the corrosive action of the soil or atmosphere indefinitely.

The pipe is preferably made from sheet metal by converting a flat sheet of metal into a tubular blank and then electrically welding the longitudinal sides edges of the blank to form an integral tubular pipe section 1.

The pipe sections 1 are then enameled as part of the manufacturing process prior to shipment to the field for laying the same. Any suitable means for enameling the pipe may be employed.

The pipe section preferably has an enlarged bell-end 2 and a normal sized spigot end 3 for insertion into the bell-end of a similar pipe section. The spigot end is not enameled since the same is not subjected to the corrosion of the soil. By leaving the spigot end unenameled, welding of the sections end to end is greatly facilitated.

In order to overcome the irregularities of the surface in which the pipe line is laid, standard curved pipe sections may be produced at the factory and enameled prior to their shipment to the field. This eliminates the problem of bending the pipe after it is enameled, which would ordinarily prevent the practical application of the invention. However, elbow or other suitable coupling members may be employed for this purpose.

Figure 1:
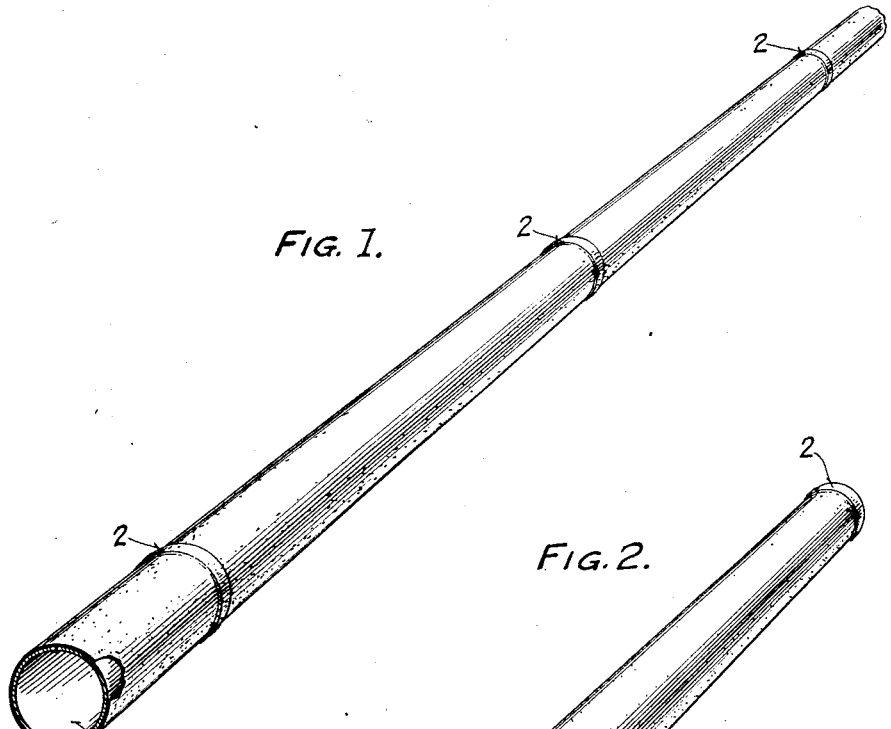
Figure 1 illustrates a pipe line employing the invention.
Figure 2:
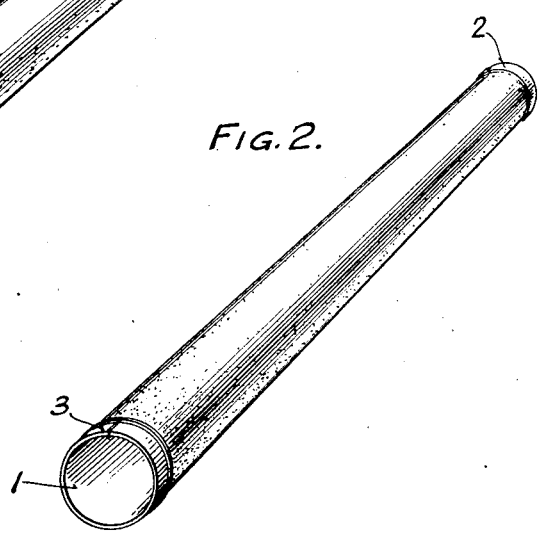
Fig. 2 illustrates a single section of pipe to be incorporated in a pipe line.
Figure 3:
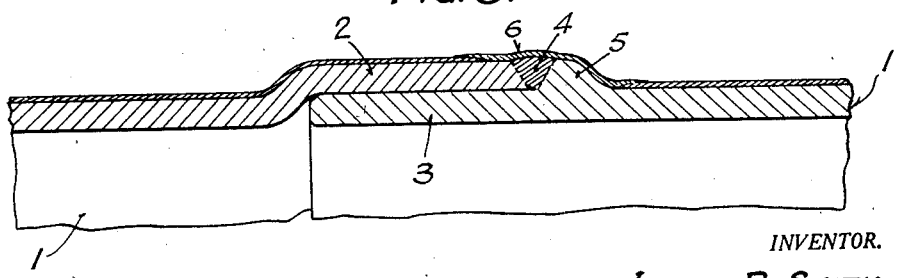
Fig. 3 is a section showing a welded joint.

The joints between the pipe sections may be welded in the fabrication of the pipe line and in order to prevent corrosion of the metal at these joints the same are enameled as shown in Fig. 3. The spigot 3 is inserted in the bell 2 and the end of the latter is welded at 4 to the spigot and to a circumferential bead 5 formed on the spigot end. The weld is then covered by a protective substance 6 which is enamel.

The pipe line thus provided may be manufactured more readily and economically than any heretofore known protected pipe line and may be employed for various purposes other than underground pipe lines where the same is found to be advantageous.

While the pipe has been described as being manufactured from sheet metal, the invention is not limited thereto, as the same is applicable to pipe manufactured in other ways.

I claim:

1. An underground pipe line comprising, in combination, a plurality of pipe sections, weld joints uniting the pipe sections end to end to provide a continuous conduit for fluids, a coating of vitreous enamel on each pipe section, and a layer of vitreous enamel covering the welded joints and uniting the coatings of vitreous enamel on the adjacent pipe sections to provide an uninterrupted envelope of vitreous enamel encasing the entire length of the pipe line.

2. An underground pipe line comprising, in combination, a plurality of pipe sections having interfitting ends, circumferential welds uniting the interfitting ends to provide a continuous conduit for fluids, the interfitting ends and welds being disposed to provide a joint having a curved surface, a coating of vitreous enamel on each pipe section, and a coating of vitreous enamel deposited on the curved surfaces of the joints uniting the coatings of vitreous enamel on the adjacent pipe sections to provide an uninterrupted envelope of vitreous enamel completely encasing the entire length of the pipe line.

In witness whereof I have signed my name at Milwaukee, Wisconsin, this 8th day of February, 1929.

LLOYD RAYMOND SMITH.